US012689655B2

(12) United States Patent
Herszfang et al.

(10) Patent No.: US 12,689,655 B2
(45) Date of Patent: Jul. 21, 2026

(54) SYSTEMS AND METHODS FOR GENERATING LOOKALIKE UNIFORM RESOURCE LOCATORS (URLs) BASED ON PENALTY-BASED GENETIC ALGORITHMS

(71) Applicant: Zscaler, Inc., San Jose, CA (US)

(72) Inventors: Hila Paz Herszfang, Tel Aviv (IL); Dani Rubin, Tel Aviv (IL); Eden Meyuhas, Tel Aviv (IL); Roi Inbar, Inbar (IL); Samir Dabit, Tel Aviv (IL)

(73) Assignee: Zscaler, Inc., San Jose, CA (US)

( * ) Notice: Subject to any disclaimer, the term of this patent is extended or adjusted under 35 U.S.C. 154(b) by 44 days.

(21) Appl. No.: 18/651,949

(22) Filed: May 1, 2024

(65) Prior Publication Data

US 2025/0310375 A1      Oct. 2, 2025

Related U.S. Application Data

(63) Continuation-in-part of application No. 18/624,791, filed on Apr. 2, 2024.

(51) Int. Cl.
*H04L 9/40*          (2022.01)
(52) U.S. Cl.
CPC ................................ *H04L 63/1483* (2013.01)
(58) Field of Classification Search
CPC ................................................. G06F 16/9566
See application file for complete search history.

(56) References Cited

U.S. PATENT DOCUMENTS

| | | | |
|---|---|---|---|
| 2018/0027013 A1* | 1/2018 | Wright | H04L 61/4511 |
| | | | 726/23 |
| 2022/0239673 A1 | 7/2022 | Kfir et al. | |
| 2022/0400128 A1 | 12/2022 | Kfir et al. | |
| 2023/0083949 A1* | 3/2023 | Mutolo | H04L 63/14 |
| | | | 726/23 |
| 2023/0388317 A1* | 11/2023 | Mutolo | H04L 63/1416 |
| 2024/0028494 A1 | 1/2024 | Herszfang et al. | |
| 2024/0073237 A1 | 2/2024 | Herszfang et al. | |

OTHER PUBLICATIONS

Alaeiyan et al., Detection of algorithmically-generated domains: An adversarial machine learning approach, Apr. 2020. (Year: 2020).*

* cited by examiner

*Primary Examiner* — Hieu T Hoang
(74) *Attorney, Agent, or Firm* — Baratta Law PLLC; Lawrence A. Baratta, Jr.; Ryan Odessa

(57) ABSTRACT

Systems and methods for generating and utilizing lookalike Uniform Resource Locators (URLs) include receiving an original target domain; generating a first generation of lookalike domains based on the original target domain and a plurality of deception methods; generating a penalty value for each of a plurality of lookalike domains in the first generation of lookalike domains; generating subsequent generations of lookalike domains and penalty values therefor based on penalty values associated with each of a plurality of lookalike domains in a preceding generation of lookalike domains; and repeating the steps for an N number of generations.

16 Claims, 6 Drawing Sheets

600

500

502

RECEIVING AN ORIGINAL TARGET DOMAIN, THE ORIGINAL TARGET DOMAIN BEING ASSOCIATED WITH AN ENTERPRISE

504

GENERATING A PLURALITY OF LOOKALIKE DOMAINS BASED ON THE ORIGINAL TARGET DOMAIN AND A PLURALITY OF DECEPTION METHODS

506

UTILIZING THE PLURALITY OF LOOKALIKE DOMAINS FOR PERFORMING ONE OR MORE FUNCTIONS

600

SYSTEMS AND METHODS FOR GENERATING LOOKALIKE UNIFORM RESOURCE LOCATORS (URLs) BASED ON PENALTY-BASED GENETIC ALGORITHMS

CROSS-REFERENCE TO RELATED APPLICATION(S)

The present disclosure is a continuation-in-part of U.S. patent application Ser. No. 18/624,791, filed Apr. 2, 2024, entitled "Systems and methods for generating and utilizing lookalike Uniform Resource Locators (URLs)," the contents of which are incorporated by reference in their entirety.

FIELD OF THE DISCLOSURE

The present disclosure generally relates to network and cloud security. More particularly, the present disclosure relates to systems and methods for generating lookalike Uniform Resource Locators (URLs) based on penalty-based genetic algorithms.

BACKGROUND OF THE DISCLOSURE

As the digital ecosystem continues to expand, the sophistication and frequency of cyber threats have escalated, with phishing attacks posing significant risks to the security of personal and corporate data. Phishing involves deceiving individuals into divulging sensitive information, such as login credentials and financial data, by masquerading as a trustworthy entity in electronic communications. Traditional anti-phishing solutions, while varied, often fall short of preemptively mitigating the risks associated with lookalike domains. These solutions typically rely on reactive measures, such as blacklisting known phishing domains or analyzing site content for fraudulent intent, which do not suffice against the dynamic and evolving nature of phishing threats. The present disclosure provides systems and methods for generating meaningful lookalike domains for use in anti-phishing functions and proactive security measures. Various embodiments involve the creation and use of lookalike domains using various deception methods that closely mimic legitimate domains/URLs that can potentially be used to trick users into believing they are visiting a trusted site.

BRIEF SUMMARY OF THE DISCLOSURE

The present disclosure relates to systems and methods for generating lookalike Uniform Resource Locators (URLs) based on penalty-based genetic algorithms. In various embodiments, the present disclosure includes a method having steps, a processing device configured to implement the steps, a cloud-based system configured to implement the steps, and as a non-transitory computer-readable medium storing instructions for programming one or more processors to execute the steps. The steps can include receiving an original target domain; generating a first generation of lookalike domains based on the original target domain and a plurality of deception methods; generating a penalty value for each of a plurality of lookalike domains in the first generation of lookalike domains; and generating subsequent generations of lookalike domains and penalty values therefor based on penalty values associated with each of a plurality of lookalike domains in a preceding generation of lookalike domains; and repeating the steps for an N number of generations.

The steps can further include utilizing the lookalike domains for performing one or more functions. The generating can include utilizing a genetic algorithm to generate the plurality of lookalike domains. Each of the lookalike domains in the first generation of lookalike domains can include a deception method therein. Generating the penalty value for each of the plurality of lookalike domains in the first generation can further include generating a deception penalty for each deception in a lookalike domain; generating a positional coefficient for each deception in the lookalike domain; determining a positional penalty for each character in the lookalike domain based on the deception penalty and positional coefficient; and determining the penalty value of the lookalike domain based on one or more positional penalties associated therewith and a collective penalty. The penalty value for each of the plurality of lookalike domains in subsequent generations can be based on the one or more positional penalties of its parents and a collective penalty. The collective penalty of an offspring lookalike domain can be independent of the collective penalties of its parents. Generating subsequent generations of lookalike domains can further include selecting a set of parents from a preceding generation of lookalike domains based on their penalty values; and generating the subsequent generation of lookalike domains based thereon. The selecting can include selecting parents from the preceding generation of lookalike domains based on their respective penalty value being below a threshold. The selecting and generating can be repeated until no penalty value of a lookalike domain in a subsequent generation of lookalike domains is below a threshold.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

Again, the present disclosure relates to systems and methods for generating and utilizing lookalike Uniform Resource Locators (URLs). More particularly, the present disclosure described systems and methods for generating, utilizing a genetic algorithm, various generations of lookalike domains. These lookalike domains can be utilized in various functions such as inline anti-phishing functions provided by a cloud-based system, providing reports to tenants of the cloud-based system, and the like. By utilizing the present genetic algorithm based lookalike domain generation, the systems are adapted to generate a wide variety of lookalike domains utilizing a plurality of deception methods without extensive computation times.

Additionally, the present disclosure elates to systems and methods for generating lookalike URLs based on penalty-based genetic algorithms. More particularly, the present disclosure provides enhancements to the processes for generating lookalike URLs described herein. These enhancements include assigning penalty values to each generated lookalike URL based on the deception method used and its location therein. This penalty value can then be utilized in filtering the generated lookalike URLs for use thereof and for determining parents of subsequent generations.

1.0 CYBERSECURITY MONITORING AND PROTECTION EXAMPLES

Figure 1A:
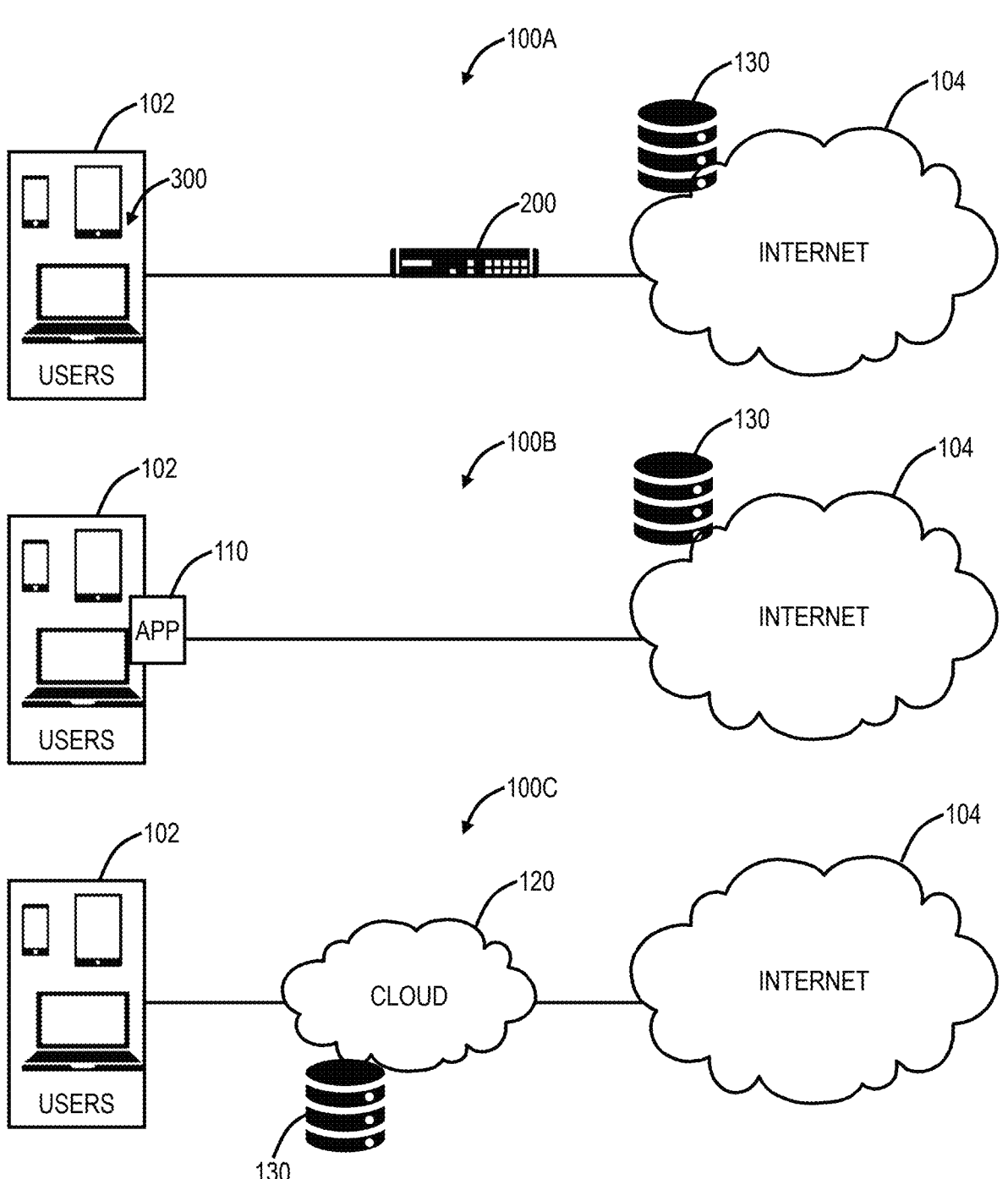
FIG. 1A is a network diagram of three example network configurations of cybersecurity monitoring and protection of a user.
Figure 2:
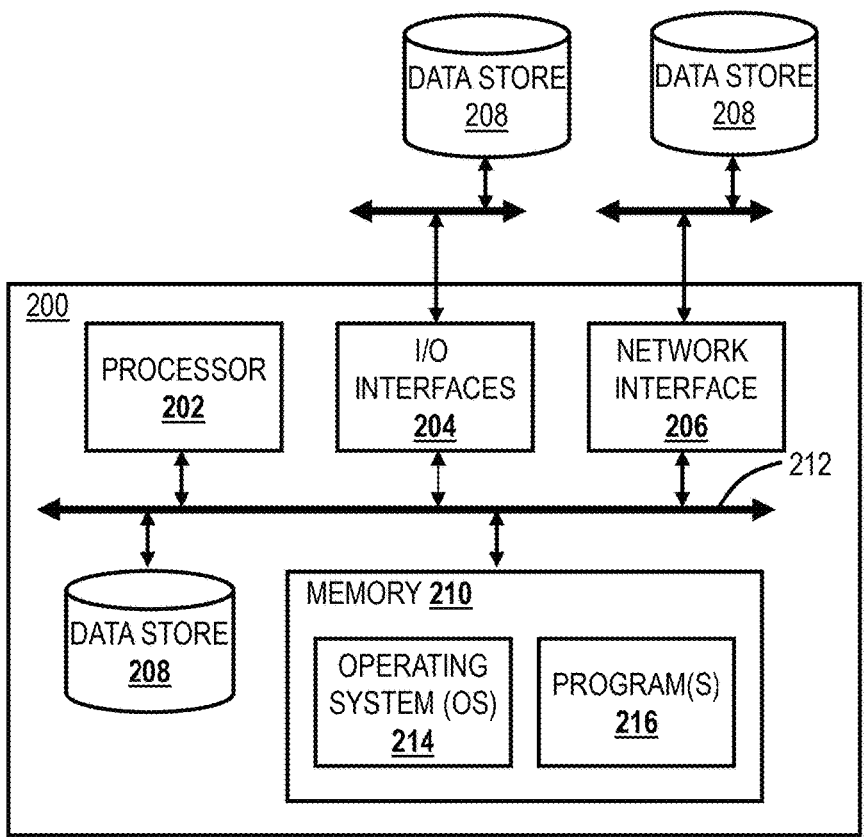
FIG. 2 is a block diagram of a server.

FIG. 1A is a network diagram of three example network configurations 100A, 100B, 100C of cybersecurity monitoring and protection of an endpoint 102. Those skilled in the art will recognize these are some examples for illustration purposes, there may be other approaches to cybersecurity monitoring (as well as providing generalized services), and these various approaches can be used in combination with one another as well as individually. Also, while shown for a single endpoint 102, practical embodiments will handle a large volume of endpoints 102, including multi-tenancy. In this example, the endpoint 102 communicates on the Internet 104, including accessing cloud services, Software-as-a-Service, etc. (each may be offered via computing resources, such as, e.g., using one or more servers 200 as illustrated in FIG. 2).

Note, the term endpoint 102 is used herein to refer to any computing device (see FIG. 3 for an example computing device 300) which can communicate on a network. The endpoint 102 can be associated with a user and include laptops, tablets, mobile phones, desktops, etc. Further, the endpoint can also mean machines, workloads, IoT devices, or simply anything associated with the company that connects to the Internet, a Local Area Network (LAN), etc.

As part of offering cybersecurity through these example network configurations 100A, 100B, 100C, there is a large amount of cybersecurity data obtained. Various embodiments of the present disclosure focus on using this cybersecurity data along with a customer's data to perform various security tasks including developing customer machine learning models and other security platforms of the like.

The network configuration 100A includes a server 200 located between the endpoint 102 and the Internet 104. For example, the server 200 can be a proxy, a gateway, a Secure Web Gateway (SWG), Secure Internet and Web Gateway, Secure Access Service Edge (SASE), Secure Service Edge (SSE), Cloud Application Security Broker (CASB), etc. The server 200 is illustrated located inline with the endpoint 102 and configured to monitor the endpoint 102. In other embodiments, the server 200 does not have to be inline. For example, the server 200 can monitor requests from the endpoint 102 and responses to the endpoint 102 for one or more security purposes, as well as allow, block, warn, and log such requests and responses. The server 200 can be on a local network associated with the endpoint 102 as well as external, such as on the Internet 104. Also, while described as a server 200, this can also be a router, switch, appliance, virtual machine, etc. The network configuration 100B includes an application 110 that is executed on the computing device 300. The application 110 can perform similar functionality as the server 200, as well as coordinated functionality with the server 200 (a combination of the network configurations 100A, 100B). Finally, the network configuration 100C includes a cloud service 120 configured to monitor the endpoint 102 and perform security-as-a-service. Of course, various embodiments are contemplated herein, including combinations of the network configurations 100A, 100B, 100C together.

The cybersecurity monitoring and protection can include firewall, intrusion detection and prevention, Uniform Resource Locator (URL) filtering, content filtering, bandwidth control, Domain Name System (DNS) filtering, protection against advanced threat (malware, spam, Cross-Site Scripting (XSS), phishing, etc.), data protection, sandboxing, antivirus, and any other security technique. Any of these functionalities can be implemented through any of the network configurations 100A, 100B, 100C. A firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The intrusion prevention and advanced threat protection can deliver full threat protection against malicious content such as browser exploits, scripts, identified botnets and malware callbacks, etc. The sandbox can block zero-day exploits (just identified) by analyzing unknown files for malicious behavior. The antivirus protection can include antivirus, antispyware, antimalware, etc. protection for the endpoints 102, using signatures sourced and constantly updated. The DNS security can identify and route command-and-control connections to threat detection engines for full content inspection. The DLP can use standard and/or custom dictionaries to continuously monitor the endpoints 102, including compressed and/or Transport Layer Security (TLS) or Secure Sockets Layer (SSL)-encrypted traffic.

In typical embodiments, the network configurations 100A, 100B, 100C can be multi-tenant and can service a large volume of the endpoints 102. Newly discovered threats can be promulgated for all tenants practically instantaneously. The endpoints 102 can be associated with a tenant, which may include an enterprise, a corporation, an organization, etc. That is, a tenant is a group of users who share a common grouping with specific privileges, i.e., a unified group under some IT management. The present disclosure can use the terms tenant, enterprise, organization, enterprise, corporation, company, etc. interchangeably and refer to some group of endpoints 102 under management by an IT group, department, administrator, etc., i.e., some group of endpoints 102 that are managed together. One advantage of multi-tenancy is the visibility of cybersecurity threats across a large number of endpoints 102, across many different organizations, across the globe, etc. This provides a large volume of data to analyze, use machine learning techniques on, develop comparisons, etc. The present disclosure can use the term "service provider" to denote an entity providing the cybersecurity monitoring and a "customer" as a company (or any other grouping of endpoints 102).

Of course, the cybersecurity techniques above are presented as examples. Those skilled in the art will recognize other techniques are also contemplated herewith. That is, any approach to cybersecurity that can be implemented via any of the network configurations 100A, 100B, 100C. Also, any of the network configurations 100A, 100B, 100C can be multi-tenant with each tenant having its own endpoints 102 and configuration, policy, rules, etc.

1.1 Cloud Monitoring

The cloud 120 can scale cybersecurity monitoring and protection with near-zero latency on the endpoints 102. Also, the cloud 120 in the network configuration 100C can be used with or without the application 110 in the network configuration 100B and the server 200 in the network configuration 100A. Logically, the cloud 120 can be viewed as an overlay network between endpoints 102 and the Internet 104 (and cloud services, SaaS, etc.). Previously, the IT deployment model included enterprise resources and applications stored within a data center (i.e., physical devices) behind a firewall (perimeter), accessible by employees, partners, contractors, etc. on-site or remote via Virtual Private Networks (VPNs), etc. The cloud 120 replaces the conventional deployment model. The cloud 120 can be used to implement these services in the cloud without requiring the physical appliances and management thereof by enterprise IT administrators. As an ever-present overlay network, the cloud 120 can provide the same functions as the physical devices and/or appliances regardless of geography or location of the endpoints 102, as well as independent of platform, operating system, network access technique, network access provider, etc.

There are various techniques to forward traffic between the endpoints 102 and the cloud 120. A key aspect of the cloud 120 (as well as the other network configurations 100A, 100B) is that all traffic between the endpoints 102 and the Internet 104 is monitored. All of the various monitoring approaches can include log data 130 accessible by a management system, management service, analytics platform, and the like. For illustration purposes, the log data 130 is shown as a data storage element and those skilled in the art will recognize the various compute platforms described herein can have access to the log data 130 for implementing any of the techniques described herein for risk quantification. In an embodiment, the cloud 120 can be used with the log data 130 from any of the network configurations 100A, 100B, 100C, as well as other data from external sources.

The cloud 120 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software-as-a-Service" (SaaS) is sometimes used to describe application programs offered through cloud computing. A common shorthand for a provided cloud computing service (or even an aggregation of all existing cloud services) is "the cloud." The cloud 120 contemplates implementation via any approach known in the art.

The cloud 120 can be utilized to provide example cloud services, including Zscaler Internet Access (ZIA), Zscaler Private Access (ZPA), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide the access control, threat prevention, and data protection. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services are also contemplated.

§ 1.2 Zero Trust

Figure 1B:
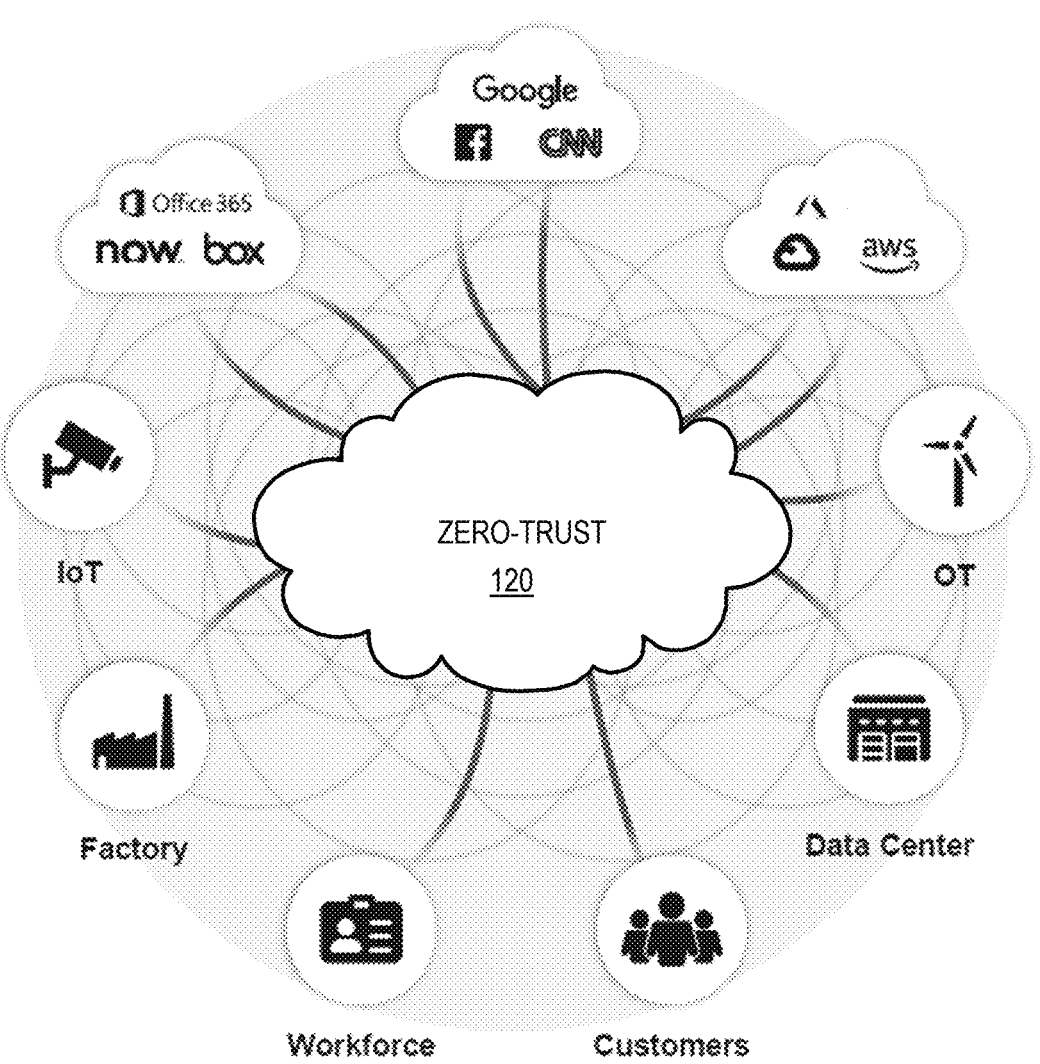
FIG. 1B is a logical diagram of the cloud operating as a zero-trust platform.

FIG. 1B is a logical diagram of the cloud 120 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud 120. Zero trust is a cybersecurity strategy where security policy is applied based on context established through least-privileged access controls and strict user authentication—not assumed trust. A well-tuned zero trust architecture leads to simpler network infrastructure, a better user experience, and improved cyberthreat defense.

Establishing a zero-trust architecture requires visibility and control over the environment's users and traffic, including that which is encrypted; monitoring and verification of traffic between parts of the environment; and strong multifactor authentication (MFA) approaches beyond passwords, such as biometrics or one-time codes. This is performed via the cloud 120. Critically, in a zero-trust architecture, a resource's network location is not the biggest factor in its security posture anymore. Instead of rigid network segmentation, your data, workflows, services, and such are protected by software-defined micro segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero-trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero-trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

§ 1.3 Log Data

With the cloud 120 as well as any of the network configurations 100A, 100B, 100C, the log data 130 can include a rich set of statistics, logs, history, audit trails, and the like related to various endpoint 102 transactions. Generally, this rich set of data can represent activity by an endpoint 102. This information can be for multiple endpoints 102 of a company, organization, etc., and analyzing this data can provide a wealth of information as well as training data for machine learning models.

The log data 130 can include a large quantity of records used in a backend data store for queries. A record can be a collection of tens of thousands of counters. A counter can be a tuple of an identifier (ID) and value. As described herein, a counter represents some monitored data associated with cybersecurity monitoring. Of note, the log data can be referred to as sparsely populated, namely a large number of counters that are sparsely populated (e.g., tens of thousands of counters or more, and possible orders of magnitude or more of which are empty). For example, a record can be stored every time period (e.g., an hour or any other time interval). There can be millions of active endpoints 102 or more. Examples of the sparsely populated log data can be the Nanolog system from Zscaler, Inc., the applicant.

Also, such data is described in the following:

Commonly-assigned U.S. Pat. No. 8,429,111, issued Apr. 23, 2013, and entitled "Encoding and compression of statistical data," the contents of which are incorporated herein by reference, describes compression techniques for storing such logs, Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and Commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

A key aspect here is that the cybersecurity monitoring is rich and provides a wealth of information to determine various assessments of cybersecurity. In some embodiments, the log data 130 can be referred to as weblogs or the like. Of note, with various cybersecurity monitoring techniques via the network configurations 100A, 100B, 100C, as well as with other network configurations, the log data 130 is a rich repository of endpoint 102 activity. Unlike websites, specific cloud services, application providers, etc., cybersecurity monitoring can log almost all of a user's 102 activity. That is, the log data 130 is not merely confined to specific activity (e.g., a user's 102 social networking activity on a specific site, a user's 102 search requests on a specific search engine, etc.).

2.0 EXAMPLE SERVER ARCHITECTURE

FIG. 2 is a block diagram of a server 200, which may be used as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Those skilled in the art will recognize the cloud 120 ultimately runs on one or more physical servers 200, virtual machines, etc.

3.0 EXAMPLE COMPUTING DEVICE ARCHITECTURE

Figure 3:
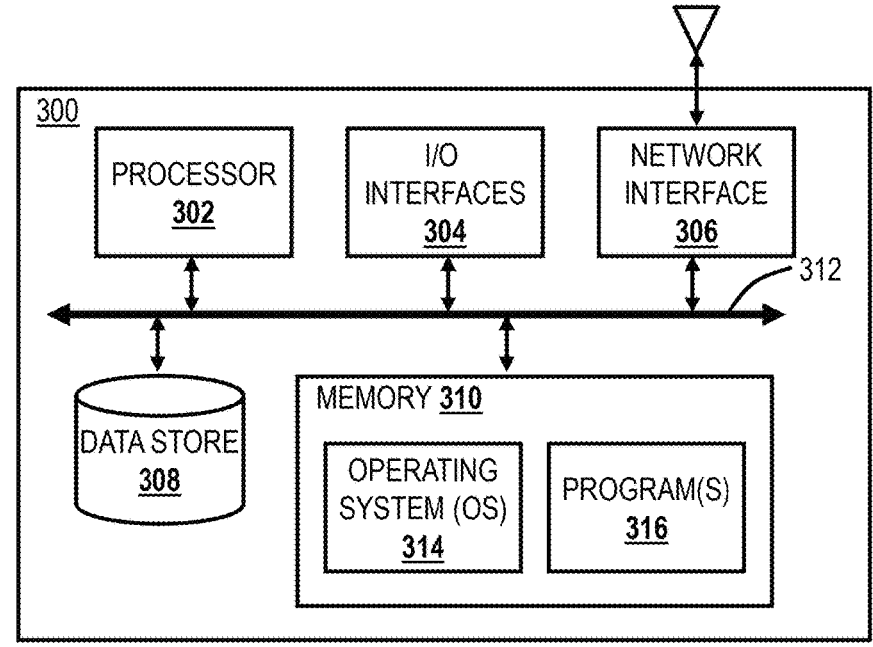
FIG. 3 is a block diagram of a computing device.

FIG. 3 is a block diagram of a computing device 300, which may be realize an endpoint 102. Specifically, the computing device 300 can form a device used by one of the endpoints 102, and this may include common devices such as laptops, smartphones, tablets, netbooks, personal digital assistants, cell phones, e-book readers, Internet-of-Things (IoT) devices, servers, desktops, printers, televisions, streaming media devices, storage devices, and the like, i.e., anything that can communicate on a network. The computing device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the computing device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the computing device 300, a semiconductor-based microprocessor (in the form of a microchip or chipset), or generally any device for executing software instructions. When the computing device 300 is in operation, the processor 302 is configured to execute software stored within the memory 310, to communicate data to and from the memory 310, and to generally control operations of the computing device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the computing device 300. For example, example programs 316 may include, but not limited to, a web browser, social networking applications, streaming media applications, games, mapping and location applications, electronic mail applications, financial applications, and the like. The application 110 can be one of the example programs.

4.0 APPLICATION FOR TRAFFIC FORWARDING AND MONITORING

Again, the network configuration 100B includes an application 110 that is executed on the computing device 300. The application 110 can perform similar functionality as the server 200, as well as coordinated functionality with the server 200 (a combination of the network configurations 100A, 100B). Of course, various embodiments are contemplated herein, including combinations of the network configurations 100A, 100B, 100C together. For example, the application 110 can perform similar functionality as the cloud 120, as well as coordinated functionality with the cloud 120.

Figure 4:
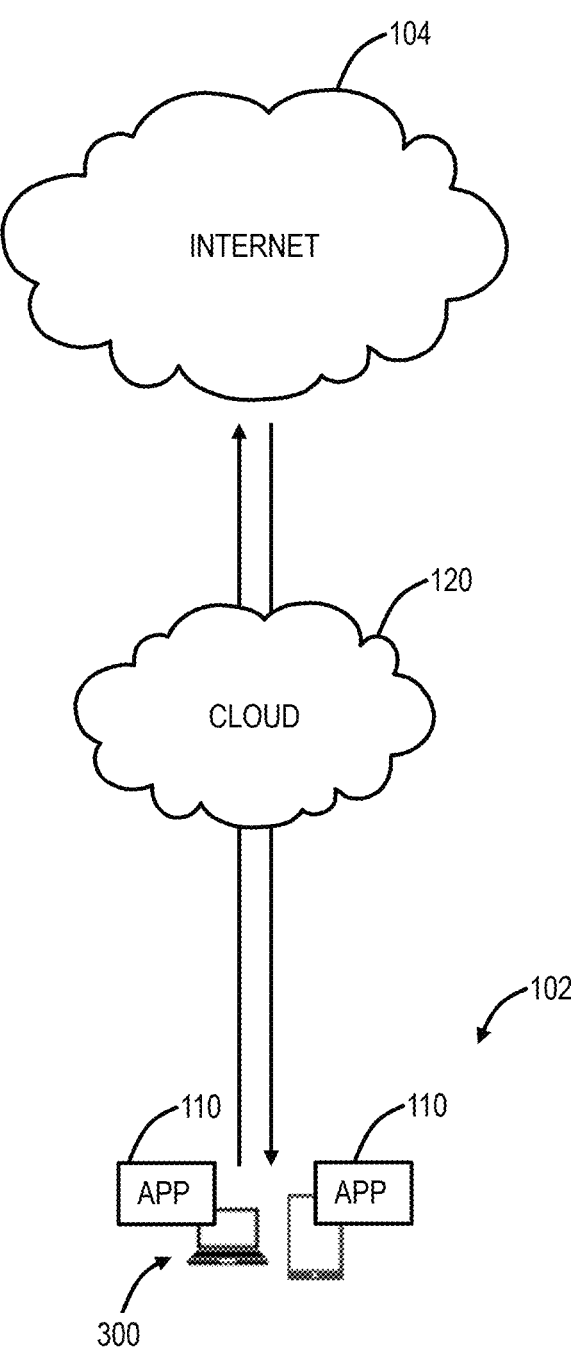
FIG. 4 is a diagram of an exemplary network configuration illustrating an application on computing devices configured to operate through the cloud.

FIG. 4 is a network diagram of an exemplary network configuration illustrating an application 110 on computing devices 300 configured to operate through the cloud 120. Different types of computing devices 300 are proliferating, including Bring Your Own Device (BYOD) as well as IT-managed devices. The conventional approach for a computing device 300 to operate with the cloud 120 as well as for accessing enterprise resources includes complex policies, VPNs, poor user experience, etc. The application 110 can automatically forward user traffic with the cloud 120 as well as ensuring that security and access policies are enforced, regardless of device, location, operating system, or application. The application 110 automatically determines if a user 102 is looking to access the open Internet 104, a SaaS app, or an internal app running in public, private, or the datacenter and routes mobile traffic through the cloud 120. The application 110 can support various cloud services, including ZIA, ZPA, ZDX, etc., allowing the best in class security with zero trust access to internal applications. As described herein, the application 110 can also be referred to as a connector application.

The application 110 is configured to auto-route traffic for seamless user experience. This can be protocol as well as application-specific, and the application 110 can route traffic with a nearest or best fit node of the cloud 120. Further, the application 110 can detect trusted networks, allowed applications, etc. and support secure network access. The application 110 can also support the enrollment of the computing device 300 prior to accessing applications, the internet, or any services provided by the cloud 120. The application 110 can uniquely detect the users 102 based on fingerprinting the user device 300, using criteria like device model, platform, operating system, device posture, etc. The application 110 can support Mobile Device Management (MDM) functions, allowing IT personnel to deploy and manage the computing devices 300 seamlessly. This can also include the automatic installation of client and SSL certificates during enrollment. Finally, the application 110 provides visibility into device and app usage of the user 102 of the computing device 300.

The application 110 supports a secure, lightweight tunnel between the computing device 300 and the cloud 120. For example, the lightweight tunnel can be HTTP-based. With the application 110, there is no requirement for PAC files, an IPSec VPN, authentication cookies, or user 102 setup.

5.0 LOOKALIKE DOMAIN GENERATION

The present disclosure relates to systems and methods for generating similar/lookalike domains for the purpose of cybersecurity. The ability to generate and identify lookalike domains/Uniform Resource Locators (URLs) for anti-phishing services is a widely sought after capability. By mimicking the facade of a legitimate website that is associated with the targeted company/destination, attackers use these lookalike URLs to deceive users. The identification of such lookalike URLs is important due to the high impact they can have on customer traffic.

By allowing companies to identify such lookalike URLs, even during the registration process, the impact of phishing sites can be greatly reduced. Similarly, during inline monitoring of user traffic, i.e., via the various network configurations described herein, the present systems can identify such lookalike URLs and perform one or more actions to limit or block access to potentially malicious sites. That is, the present systems can be adapted to, for each tenant associated with the cloud 120, generate a plurality of lookalike URLs based on the tenant's domains, and monitor traffic to block access to any of the plurality of lookalike URLs. Similarly, the systems can be adapted to determine any legitimate URLs accessed by users associated with each tenant, generate lookalike URLs based thereon, and block access to any of the lookalike URLs for protection of enterprise and user data.

In various embodiments, the present systems and methods can be implemented during the domain registration process. For example, identifying a registered lookalike URL is a potential threat to a company and can be used to predict an upcoming phishing attack which is adapted to target the company. A lookalike URL which is not yet registered can allow the company to proactively purchase it as a defense against future attacks.

Traditionally, the identification of lookalike URLs utilize already registered URLs by querying known registered URLs for identifying similar strings. In such approaches, the methods compare already registered domains to a company's online assets, then identify any similar domains according to a similarity metric. Although widely used, such methods focus solely on yielding already registered domains and are not adapted to suggest domains for proactive measures against potential future attacks as described.

Other traditional approaches may be adapted to generate similar URLs based on common deception methods such as Top-Level Domain (TLD) swap, character repetition, or graphically similar characters. While these approaches may suggest not-yet-registered domains, they are typically limited to one deception method. This is because any attempts to combine more deception methods together yields such a large number of potential strings, it can take a computer an excessively large amount of time to generate. Further, such methods generate combinations that are so far from the original URL, that it makes most of the generated lookalike URLs irrelevant. Thus, most traditional methods only utilize one known deception method at a time to generate lookalike URL options.

Because of the above mentioned deficiencies, the present disclosure provides systems and methods for generating and identifying lookalike URLs which can be registered or not registered based on combinations of deception methods. In various embodiments, the capabilities of the present systems and methods are enabled by employing genetic algorithms to generate meaningful lookalike URLs. By utilizing genetic algorithms, the present systems can generate and uncover registered URLs and unregistered URLs with a combination of more than one deception method per lookalike URL with a short computation time. That is, the present methods can generate a population of lookalike URLs, where the population of lookalike URLs can include both registered and unregistered URLs which involve potentially large numbers of deception methods within a relatively short computation time.

5.1 Genetic Algorithm for Generating Lookalike Domains

In various embodiments, the present systems and methods utilize genetic algorithms for generating a population of meaningful lookalike domains based on an original target domain. That is, the present processes can be initiated responsive to receiving an original target domain, i.e., the cloud 120 performs the present processes for domains associated with its tenants, domains frequently visited by users, etc. The original target domain is represented as a vector of strings having a size equal to the domain length+3. For example, a domain (exampleurl.com) has the second-level domain "exampleurl" which has 10 characters. Based thereon, the vector representing this domain will have a string size of 10+3. The 3 additional characters are based on the following. The first character is a prefix, the character before the last is a postfix, and the last character is the Top-Level Domain (TLD), i.e., ".com". The characters between the prefix and postfix are the original Second-Level Domain (SLD) "exampleurl". For example, an illustration of a vectorized representation of the original URL (exampleu-rl.com) can be as follows:

| Index | Value |
|-------|-------|
| 1 | [ ] |
| 2 | [e] |
| 3 | [x] |
| 4 | [a] |
| 5 | [m] |
| 6 | [p] |
| 7 | [l] |
| 8 | [e] |
| 9 | [u] |
| 10 | [r] |
| 11 | [l] |
| 12 | [ ] |
| 13 | [.com] |

The 1st and 12th values are left blank, as there is no prefix or postfix at this time.

To generate an initial population (first generation) of lookalike URLs, the following steps are performed. The initial population of lookalike URLs involves the generation of similar strings, each with a single deception method. The deception methods used can include, but are not limited to, predefined TLD swap, repetition of a character, omission of a character, added hyphens, added letters, added numbers, extending the URL with a common postfix, and the like. The output from each deception method is in the vectorized format shown above. For example, when considering the original/target domain "exampleurl.com", and a plurality of deception methods, the following list of lookalike domains can be generated.

| Lookalike URL | Vectorized | Method |
|---------------|-----------|--------|
| exampleuarl.com | [[ ], [e], [x], [a], [m], [p], [l], [e], [u], [ar], [l], [ ], [.com]] | Mid Insertion |
| anexampleurl.com | [[an], [e], [x], [a], [m], [p], [l], [e], [u], [r], [l], [ ], [.com]] | Prefix |
| exampleurlonline.com | [[ ], [e], [x], [a], [m], [p], [l], [e], [u], [r], [l], [online], [.com]] | Extension |
| example-url.com | [[ ], [e], [x], [a], [m], [p], [l], [e], [-u], [r], [l], [ ], [.com]] | Hyphenation |
| exampleu-rl.com | [[ ], [e], [x], [a], [m], [p], [l], [e], [u], [-r], [l], [ ], [.com]] | Hyphenation |
| exmpleurl.com | [[ ], [e], [x], [ ], [m], [p], [l], [e], [u], [r], [l], [ ], [.com]] | Omission |
| examplleurl.com | [[ ], [e], [x], [a], [m], [p], [ll], [e], [u], [r], [l], [ ], [.com]] | Repetition |
| exaampleurl.com | [[ ], [e], [x], [aa], [m], [p], [l], [e], [u], [r], [l], [ ], [.com]] | Repetition |
| exampleurl.net | [[ ], [e], [x], [a], [m], [p], [l], [e], [u], [r], [l], [ ], [.net]] | TLDSwap |
| exampleurl.org | [[ ], [e], [x], [a], [m], [p], [l], [e], [u], [r], [l], [ ], [.org]] | TLDSwap |

The above table shows a plurality of generated lookalike URLs based on the parent URL (exampleurl.com). Each of the generated lookalike URLs in this first generation are generated based on a single deception method. The alteration of each of the lookalike URLs is bolded for ease of viewing. For example, the lookalike URL "exampleuarl.com" includes an insertion of the letter a as shown. It will be appreciated that each of the generated lookalike URLs all have the same "chromosome" length (same number of values), i.e., vectorized values as the parent URL vectorized representation.

Each of the generated lookalike URLs is assigned a similarity score associated with the original/parent URL. That is, the similarity of each of the generated lookalike URLs to the original URL is calculated. In various embodiments, this similarity score can be generated based on Levenshtein distance, or any other distance metric process of the like such as, but not limited to, graphical similarity, context, phonetic closeness, indices of change, and length of string. The similarity score of each of the generated lookalike URLs can include the following scores.

| Lookalike URL | Vectorized | Similarity |
|---------------|-----------|-----------|
| exampleuarl.com | [[ ], [e], [x], [a], [m], [p], [l], [e], [u], [ar], [l], [ ], [.com]] | 0.7 |
| anexampleurl.com | [[an], [e], [x], [a], [m], [p], [l], [e], [u], [r], [l], [ ], [.com]] | 0.6 |
| exampleurlonline.com | [[ ], [e], [x], [a], [m], [p], [l], [e], [u], [r], [l], [online], [.com]] | 0.72 |
| example-url.com | [[ ], [e], [x], [a], [m], [p], [l], [e], [-u], [r], [l], [ ], [.com]] | 0.9 |
| exampleu-rl.com | [[ ], [e], [x], [a], [m], [p], [l], [e], [u], [-r], [l], [ ], [.com]] | 0.2 |
| exmpleurl.com | [[ ], [e], [x], [ ], [m], [p], [l], [e], [u], [r], [l], [ ], [.com]] | 0.75 |
| examplleurl.com | [[ ], [e], [x], [a], [m], [p], [ll], [e], [u], [r], [l], [ ], [.com]] | 0.68 |

-continued

| Lookalike URL | Vectorized | Similarity |
|---|---|---|
| exaampleurl.com | [[ ], [e], [x], [aa], [m], [p], [l], [e], [u], [r], [l], [ ], [.com]] | 0.74 |
| exampleurl.net | [[ ], [e], [x], [a], [m], [p], [l], [e], [u], [r], [l], [ ], [.net]] | 0.71 |
| exampleurl.org | [[ ], [e], [x], [a], [m], [p], [l], [e], [u], [r], [l], [ ], [.org]] | 0.8 |

From this first generation of lookalike URLs, a set of parents must be selected in order to generate a second generation. In various embodiments, parents can be selected from the first generation based on the similarity score of each of the lookalike URLs. More particularly, in various embodiments, a plurality of parents are selected from the first generation of lookalike URLs based on their similarity score being above a threshold. The first generation of lookalike URLs is filtered based on this threshold, where the URLs which have a similarity score above the threshold are used as parents for generating the second generation. In this present example, the similarity threshold is contemplated as 0.71, leaving the following lookalike URLs to be used as parents of the second generation.

| Lookalike URL | Vectorized | Similarity |
|---|---|---|
| exampleurlonline.com | [[ ], [e], [x], [a], [m], [p], [l], [e], [u], [r], [l], [online], [.com]] | 0.72 |
| example-url.com | [[ ], [e], [x], [a], [m], [p], [l], [e], [-u], [r], [l], [ ], [.com]] | 0.9 |
| exmpleurl.com | [[ ], [e], [x], [ ], [m], [p], [l], [e], [u], [r], [l], [ ], [.com]] | 0.75 |
| exaampleurl.com | [[ ], [e], [x], [aa], [m], [p], [l], [e], [u], [r], [l], [ ], [.com]] | 0.74 |
| exampleurl.net | [[ ], [e], [x], [a], [m], [p], [l], [e], [u], [r], [l], [ ], [.net]] | 0.71 |
| exampleurl.org | [[ ], [e], [x], [a], [m], [p], [l], [e], [u], [r], [l], [ ], [.org]] | 0.8 |

It will be appreciated that any similarity score threshold can be utilized, and the present threshold of 0.71 shall be contemplated as a non-limiting example.

Once a set of parents is selected as described above, the second generation of lookalike URLs can be generated. The production of a new lookalike URL is based on two or more parents, where each character of the vector is chosen at random or alternatively with a weighted probability. That is, the weight of a character can be increased based on that character having a deception therein or based on the similarity of the deception. For example, an offspring of the parents "example-url.com" and "exmpleurl.com" may be "exmple-url.com" based on the following selections.

| Parents | Offspring |
|---|---|
| [[ ], [e], [x], [a], [m], [p], [l], [e], [-u], [r], [l], [ ], [.com]] | [[ ], [e], [x], [ ], [m], [p], [l], [e], [-u], [r], [l], [ ], [.com]] |
| [[ ], [e], [x], [ ], [m], [p], [l], [e], [u], [r], [l], [ ], [.com]] | |

The selected characters from each parent are bolded to show the character selection process.

In another example, an offspring of the parents "exampleurlonline.com" and "exampleurl.net" may be "exampleurlonline.net" based on the following selections.

| Parents | Offspring |
|---|---|
| [[ ], [e], [x], [a], [m], [p], [l], [e], [u], [r], [l], [online], [.com]] | [[ ], [e], [x], [a], [m], [p], [l], [e], [u], [r], [l], [online], [.net]] |
| [[ ], [e], [x], [a], [m], [p], [l], [e], [u], [r], [l], [ ], [.net]] | |

Again, the selected characters from each parent are bolded to show the character selection process. The above described offspring generation methods can be utilized for each pairing of parents from the first generation to generate a set of lookalike URLs for the second generation. Thus far, the second generation includes the lookalike URLs "exmple-url.com" and "exampleurlonline.net". It is noted that each of these lookalike URLs in the second generation now each include 2 deception techniques therein. For example, the lookalike URL "exampleurlonline.net" includes an extension and a TLD swap, i.e., it includes the extension of "online" and the TLD swap of ".net".

The deception methods/techniques and similarity of the evolved population (second generation) is based on the attributes of the parents. For example, the similarity may reflect a multiplication or any other function of the parents' similarity. The deception methods will include all deception methods that are attributed to each of the chosen indices. For example, given the offspring in the second generation which includes both of the deception methods of its parents, the methods are [extension, TLD swap] and the similarity is $0.72*0.71=0.5112$. The lookalike URLs of the second generation and their associated deception methods and similarity scores are shown below.

| URL | Vectorized | Method | Similarity |
|---|---|---|---|
| exmple-url.com | [[ ], [e], [x], [ ], [m], [p], [l], [e], [-u], [r], [l], [ ], [.com]] | Omission, Hyphenation | 0.648 |
| exampleurlonline.net | [[ ], [e], [x], [a], [m], [p], [l], [e], [u], [r], [l], [online], [.net]] | Extension, TLD Swap | 0.5112 |

The offspring, i.e., the lookalike URLs within the second generation can then be filtered for determining parents of a third generation. The filtering can be based on their respective similarity score, i.e., based on a similarity threshold, or based on any of number of deception methods, minimum or maximum string length, strings that cannot be registered as a URL, etc. For example, lookalike URLs within the second generation, or any other generation, can be discarded if they have too many deception methods utilized therein, have characteristics that prohibit it from being registered as a URL, etc. In the present example, the offspring are filtered based on their similarity score, i.e., based on a similarity score threshold of 0.55. That is, only offspring having a similarity score above 0.55 are retained as the second generation. Thus, the second generation of lookalike URLs is shown below.

| URL | Vectorized | Method | Simi-larity |
|---|---|---|---|
| exmple-url.com | [[ ], [e], [x], [ ], [m], [p], [l], [e], [-u], [r], [l], [ ], [.com]] | Omission, Hyphenation | 0.648 |

The process described herein can then be repeated to generate any number of N generations, N being an integer. That is, the selection of parents, generation of offspring, filtering of offspring is repeated until a specific condition is met. Such a condition can be that no new offspring yield a similarity score above a threshold, the condition can be a set number of generations, and the like, wherein the integer N is based thereon. For example, the process can be repeated until no new offspring have a similarity score above a threshold, or the process can be repeated until a specific number of generations is achieved.

5.2 Utilizing Generated Lookalike Domains

The generated lookalike URLs from each generation can be logged and utilized for performing various functions within the cloud 120. For example, the lookalike URLs can be displayed via a User Interface (UI) to enterprises utilizing the cloud 120, wherein the lookalike URLs are generated based on the enterprise's domains. That is, the original target domain from which the various generations of lookalike URLs are generated is associated with the enterprise, and the generated lookalike URLs are presented to the enterprise within a report. This report can include each of the generated and filtered lookalike URLs from the processes described above, and can further include, for each lookalike URL, the deception methods used to generate it, whether it is registered, who it was registered by, whether it is associated with a known phishing site, and any actions that can be taken to reduce risk associated with the lookalike URL. An example action can include providing the enterprise the ability to purchase any unregistered lookalike URLs as a precautionary measure.

Additionally, the URL filtering of the cloud 120 can leverage the lookalike URLs generated for legitimate sites. That is, the cloud 120 can block, allow, or limit website access based on known/generated lookalike URLs. For example, by monitoring traffic of users through the cloud 120, the cloud 120 can block access to known lookalike URLs, the known lookalike URLs being generated lookalike URLs that are known to be registered. That is, the present systems can be adapted to, for each tenant associated with the cloud 120, generate a plurality of lookalike URLs based on the tenant's domains, and monitor traffic to block access to any of the plurality of lookalike URLs. Similarly, the systems can be adapted to determine legitimate URLs frequently accessed by users associated with each tenant, generate lookalike URLs based thereon, and block access to any of the lookalike URLs for protection of enterprise and user data.

5.3 Process for Generating and Utilizing Lookalike Domains

Figure 5:
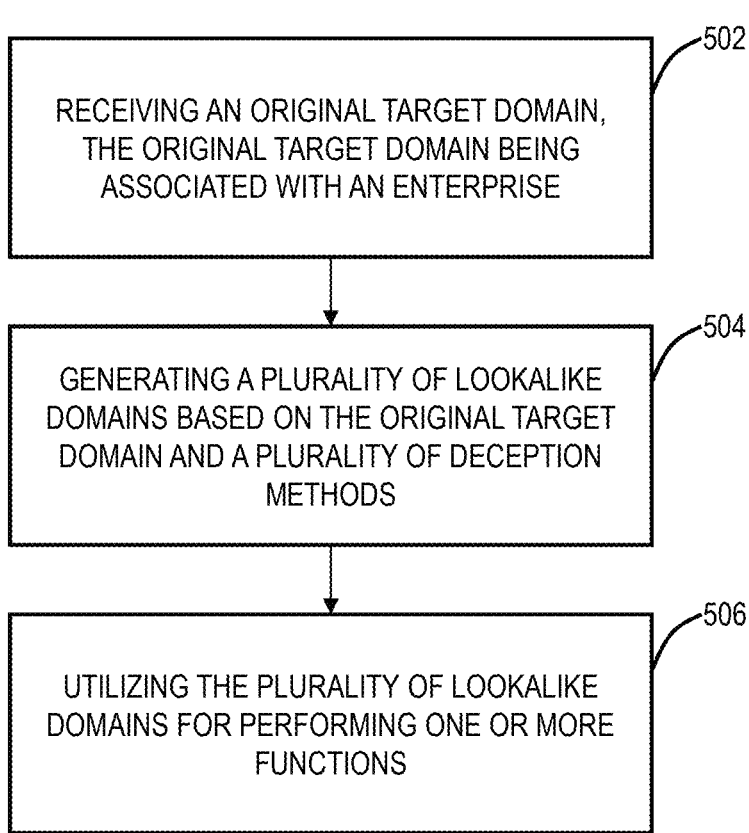
FIG. 5 is a flow diagram of a process for generating and utilizing lookalike domains.

FIG. 5 is a flow diagram of a process 500 for generating and utilizing lookalike domains. The process 500 includes receiving an original target domain, the original target domain being associated with an enterprise, i.e., a tenant of the cloud (step 502); generating a plurality of lookalike domains based on the original target domain and a plurality of deception methods (step 504); and utilizing the plurality of lookalike domains for performing one or more functions, i.e., via the cloud (step 506).

The process 500 can further include wherein the generating includes utilizing a genetic algorithm to generate the plurality of lookalike domains. The generating can include generating a first generation of lookalike domains, each including a deception method therein, and wherein the plurality of lookalike domains includes the first generation of lookalike domains. The steps can further include computing a similarity score for each of the lookalike domains in the first generation of lookalike domains, wherein the similarity score represents a similarity between each of the lookalike domains in the first generation of lookalike domains and the original target domain. The steps can further include selecting a set of parents from the first generation of lookalike domains; generating a second generation of lookalike domains based on the selected set of parents, wherein the plurality of lookalike domains includes the first generation of lookalike domains and the second generation of lookalike domains; and computing a similarity score for each of the lookalike domains in the second generation of lookalike domains. The selecting can include selecting parents from the first generation of lookalike domains based on their respective similarity score being above a threshold. The selecting, generating, and computing can be repeated until a preconfigured number of generations is reached or until no similarity score of the lookalike domains is above a threshold. The similarity score of each of the lookalike domains in the second generation of lookalike domains can be the result of a multiplication of its parent's similarity scores. The one or more functions can include providing a report to the tenant, wherein the report includes each of the plurality of lookalike domains, the deception methods used to generate each of the plurality of lookalike domains, whether each of the plurality of lookalike domains is registered, who it is registered by, and whether each of the plurality of lookalike domains is associated with a known phishing site.

6.0 PENALTIES FOR LOOKALIKE URLS

The present disclosure describes systems and methods for utilizing genetic algorithms to uncover both registered and unregistered lookalike URLs. By utilizing the present systems, the cloud 120, via its various components and security services, is adapted to introduce and enforce policies based on lookalike URLs which include more than a single deception method to a given character, while avoiding high computational complexity experienced by traditional bootstrap approaches.

The processes described herein utilize similarity scores assigned to each lookalike URL within a generation. As described, these similarity scores are used for filtering tailored to address aspects of deception, aiming to create effective lookalike URLs that can be used in various cybersecurity applications.

Each lookalike URL is assigned a deception penalty for each deception included therein, as shown in the following table.

| Vectorized Lookalike URL | Method | Penalty Type | Deception Penalty |
|---|---|---|---|
| [[ ], [e], [x], [a], [m], [p], [l], [e], [u], [ar], [l], [ ], [.com]] | Mid Insertion | Graphical | 0.8 |
| [[an], [e], [x], [a], [m], [p], [l], [e], [u], [r], [l], [ ], [.com]] | Prefix | Context | 0.4 |
| [[ ], [e], [x], [a], [m], [p], [l], [e], [u], [r], [l], [online], [.com]] | Extension | Context | 0.3 |
| [[ ], [e], [x], [a], [m], [p], [l], [e], [-u], [r], [l], [ ], [.com]] | Hyphenation | Context | 0.3 |
| [[ ], [e], [x], [a], [m], [p], [l], [e], [u], [-r], [l], [ ], [.com]] | Hyphenation | Context | 0.9 |
| [[ ], [e], [x], [ ], [m], [p], [l], [e], [u], [r], [l], [ ], [.com]] | Omission | Graphical | 0.6 |
| [[ ], [e], [x], [a], [m], [p], [ll], [e], [u], [r], [l], [ ], [.com]] | Repetition | Graphical | 0.4 |
| [[ ], [e], [x], [aa], [m], [p], [l], [e], [u], [r], [l], [ ], [.com]] | Repetition | Graphical | 0.5 |
| [[ ], [e], [x], [a], [m], [p], [l], [e], [u], [r], [l], [ ], [.net]] | TLDSwap | Context | 0.5 |
| [[ ], [e], [x], [a], [m], [p], [l], [e], [u], [r], [l], [ ], [.org]] | TLDSwap | Context | 0.3 | irrelevant lookalike URLs, and for filtering to determine parents of a subsequent generation via a parent selection process. When filtering irrelevant lookalike URLs, URLs with a low similarity score will not be considered as good candidates and will be removed from the pool of lookalike URLs. When filtering for determining parents of a subsequent generation, URLs with a similarity score below a threshold will not be removed from the pool of lookalike URLs but will not be selected as parents of a subsequent generation.

In various embodiments, a novel process for determining a penalty value for each of the generated lookalike URLs is contemplated. This penalty is based on a graphical distance, phonetic distance, and context distance, in the scope of position and URL. Based thereon, the similarity score of a lookalike URL is the inverse of the penalty for the lookalike URL. This represented by the following equation.

$$\text{Similarity}_{Lookalike\ URL} = 1 - \text{Penalty}_{Lookalike\ URL}$$

The process of generating vectorized lookalike URLs involves utilizing various deception methods, each of which incorporates specific deception penalties based on different aspects of the URL changes. For instance, the mid insertion deception technique applies deception penalties based on the graphical alterations observed within the string of the URL. This method evaluates the visual discrepancies that occur when characters are inserted into the middle of the URL, affecting its appearance and potentially misleading users.

Similarly, the TLD swap method imposes deception penalties based on the contextual relevance of the new domain. This approach assesses how swapping the TLD (such as changing .com to .net) might affect the perceived legitimacy or relevance of the URL, considering factors such as the commonness of the TLD or its association with certain types of websites.

The vowel swap deception method targets the phonetic sound of the URL. Deception penalties are assigned based on changes to the URL's phonetics that occur when vowels within the domain name are swapped. This method specifically looks at how such alterations might confuse users by maintaining a similar auditory representation, even though the spelling of the URL has been modified. Each of these methods utilizes a specific deception penalty mechanism The deception penalty is based on the deception method used for a particular lookalike URL. That is, in various embodiments, a deception penalty assigned to a lookalike URL is based on the deception method, where each deception method is associated with a particular deception penalty value. The deception penalty value of each deception method can be determined prior to execution of the present systems.

It will be appreciated that the deception penalty can be further based on the context between known words that a deception may separate. For example, in the case of the two hyphenation deception methods shown, the deception penalty further depends on the context between known words which the hyphen separates. When the words before and after the hyphen are unknown English words, the penalty will be higher. That is, "example-url.com" incurs a lower penalty than "exampleu-rl.com" even though they both include a single hyphenation.

Further, a positional coefficient, which is a function of the position of the alteration/deception and the length of the URL, is determined. The positional coefficient can be determined based on a distance of the alteration from an edge and the URL length, i.e., if the deception is in the $3^{rd}$ character of a URL, then the "distance from edge" value will be 3 and if the SLD includes 13 characters, then the "length" variable will be 13. It will be noted that the distance from the edge for prefix and postfix is defined to be 1. The following equation shows an embodiment for determining the positional coefficient of a lookalike URL based on the distance of the deception from an edge and the URL length. It will be appreciated that the following equation represents one embodiment for determining the positional coefficient, and in other embodiments, the positional coefficient can be determined based on any function of the deception position and the length of the lookalike URL.

$$coef(\text{position, length}) = clip\left(\frac{C}{\text{distance from edge}^a \cdot \text{length}^b}, 0.1, 1\right)$$

In this example, C is a constant used to normalize the coefficient according to expected lengths of the lookalike URL. Further, a is a power given to the distance of the alteration from an edge. Finally, b is a power given to the URL length.

In various embodiments, a collective penalty can be determined for each of the lookalike URLs. This can be based on the presence of non-latin characters in a lookalike URL, lookalike URLs that are too long or too short, the existence of more than one hyphen in a lookalike URL, etc. Again, the collective penalty is assigned to a lookalike URL as a whole, and is not assigned to a specific index/character of the lookalike URL as is done with the deception penalty and positional coefficient.

Further, a positional penalty of a given deception method is a function of the positional coefficient and the deception penalty. For example, the function can be represented as follows.

$$Positional\_Penalty_j = coefficient \cdot deception\_penalty$$

For example, given a positional coefficient of 0.5, and a deception penalty of 0.5, the positional penalty will be 0.25. This function can be demonstrated by the following mathematical representation.

$$Positional\_Penalty_j = 0.5 \cdot 0.5 = 0.25$$

Again, it will be appreciated that the present method for determining the positional penalty represents one embodiment, and in other embodiments, the positional penalty can be determined based on any function of the positional coefficient and the deception penalty of a character/index of a lookalike URL. The determination of a positional penalty is performed for each index of a lookalike URL. That is, each index that includes a deception will have a positional penalty assigned thereto, and in various embodiments, indexes that do not include a deception will be assigned a positional penalty of 0.

The one or more positional penalties can then be represented in a penalty vector, the penalty vector being based on the vectorized representation of the associated lookalike URL. Again, the position in the vector where the positional penalty is assigned to is based on the position of the deception method within the vectorial representation of the lookalike URL. For example, if the deception method is in position 3 of the lookalike URL, and the positional penalty is 0.25, the vectorized penalty is as follows.

| Vectorized Lookalike URL | Vectorized Penalty |
|---|---|
| [[ ], [e], [xx], [a], [m], [p], [l], [e], [u], [r], [l], [ ], [.com] | [[0], [0], [0.25], [0], [0], [0], [0], [0], [0], [0], [0], [0]] |

The total penalty for a lookalike URL can therefore be determined as follows. In various embodiments, to determine the total penalty for a lookalike URL (lookalike URL penalty or penalty value), the present systems are adapted to determine the sum of all positional penalties associated with a lookalike URL. Further, if present, any collective penalties associated with the lookalike URL are summed as well. Finally, all positional penalties and collective penalties are summed to determine the lookalike URL penalty of an associated lookalike URL. This process can be represented by the following function.

$$Penalty_{lookalike\ URL} = \sum_i collective\_penalty_i + \sum_j penalty_j$$

Utilizing the example lookalike URL described above with one positional penalty of 0.25, and assuming a collective penalty of 0.1 has been assigned thereto, the lookalike URL penalty of this example lookalike URL is described below.

$$Penalty_{lookalike\ URL} = 0.1 + 0.25 = 0.35$$

In various embodiments, the process described above is contemplated for use with an initial population of lookalike URLs. That is, in various embodiments, the process for determining lookalike URL penalties described above is utilized only for a first generation of lookalike URLs. Therefore, the following process is contemplated for determining lookalike URL penalties for lookalike URLs in subsequent generations.

For the lookalike URLs in a next generation that are created, offspring will also be assigned with the evolved vectorized penalty that is selected upon the same indexes of the generated lookalike URL. That is, the positional penalties of an offspring lookalike URL are based on the positional penalties of its parents. For example, such an evolution of the vectorized penalty may include the following.

| Parents | Vectorized Penalty |
|---|---|
| [[ ], [e], [x], [a], [m], [p], [l], [e], [-u], [r], [l], [ ], [.com]] | [[0], [0], [0], [0], [0], [0], [0], [0], [0.1], [0], [0], [0], [0]] |
| [[ ], [e], [x], [ ], [m], [p], [l], [e], [u], [r], [l], [ ], [.com]] | [[0], [0], [0], [0.4], [0], [0], [0], [0], [0], [0], [0], [0]] |

| Offspring | Vectorized Penalty |
|---|---|
| [[ ], [e], [x], [ ], [m], [p], [l], [e], [-u], [r], [l], [ ], [.com]] | [[0], [0], [0], [0.4], [0], [0], [0], [0], [0.1], [0], [0], [0], [0]] |

Therefore, for each index that an offspring "inherits" from its parents, as described herein, the positional penalty associated with that index is also inherited. Contrastingly, collective penalties are assigned for each offspring lookalike URL regardless of its parents collective penalties.

In order to determine the lookalike URL penalty of a lookalike URL in such a generation, i.e., not the first generation, the systems do not perform the process described above due to the possibility of the result being greater than 1. That is, the systems must output a lookalike URL penalty that is between 0 and 1. Thus, the systems can employ the following function for determining the lookalike URL penalty of lookalike URLs in subsequent generations and/or include a plurality of deception methods and positional penalties.

$$Penalty_{Lookalike\ URL} = min\left(1, 1 - \prod_i (1 - penalty_i) + \sum_j collective\_penalty_j\right)$$

Thus, the systems sum the compliments of each positional penalty, guaranteeing a higher penalty that is also between 0 and 1. Because the collective penalty can potentially drive the lookalike URL penalty to a number that is greater than 1, the systems clip the output, thereby ensuring an output between 0 and 1.

By utilizing the above described steps, the lookalike URL penalty of an offspring lookalike URL can be represented as follows.

| Parents | Vectorized Penalty | Collective Penalty | Lookalike URL Penalty |
|---|---|---|---|
| | [[0], [0], [0], [0], [0], [0], [0], [0], [0.1], [0], [0], [0], [0], [0]] | 0.05 | 0.15 |
| | [[0], [0], [0], [0.4], [0], [0], [0], [0], [0], [0], [0], [0], [0]] | 0.05 | 0.45 |

| Offspring | Vectorized Penalty | Collective Penalty | Lookalike URL Penalty |
|---|---|---|---|
| | [[0], [0], [0], [0.4], [0], [0], [0], [0], [0.1], [0], [0], [0], [0]] | 0.05 | 0.51 |

It can be seen that the lookalike URL penalty of the offspring is larger than each of the lookalike URL penalties of its parents, but not a pure addition.

Again, the various processes described herein utilize similarity scores assigned to each lookalike URL within a generation. These similarity scores are used for filtering irrelevant lookalike URLs, and for filtering to determine parents of a subsequent generation via a parent selection process. When filtering irrelevant lookalike URLs, URLs with a low similarity score will not be considered as good candidates and will be removed from the pool of lookalike URLs. When filtering for determining parents of a subsequent generation, URLs with a similarity score below a threshold will not be removed from the pool of lookalike URLs but will not be selected as parents of a subsequent generation. Because of the close relationship between the described similarity scores and the lookalike URL penalties, the two concept can be utilized interchangeably. That is, the relationship between the similarity score of a lookalike URL and the lookalike URL penalty is an inverse relationship. Thus, when filtering irrelevant lookalike URLs, URLs with a high lookalike URL penalty will not be considered as good candidates and will be removed from the pool of lookalike URLs. When filtering for determining parents of a subsequent generation, URLs with a lookalike URL penalty above a threshold will not be removed from the pool of lookalike URLs but will not be selected as parents of a subsequent generation.

6.1 Process for Generating Lookalike URLs with Penalty Values

Figure 6:
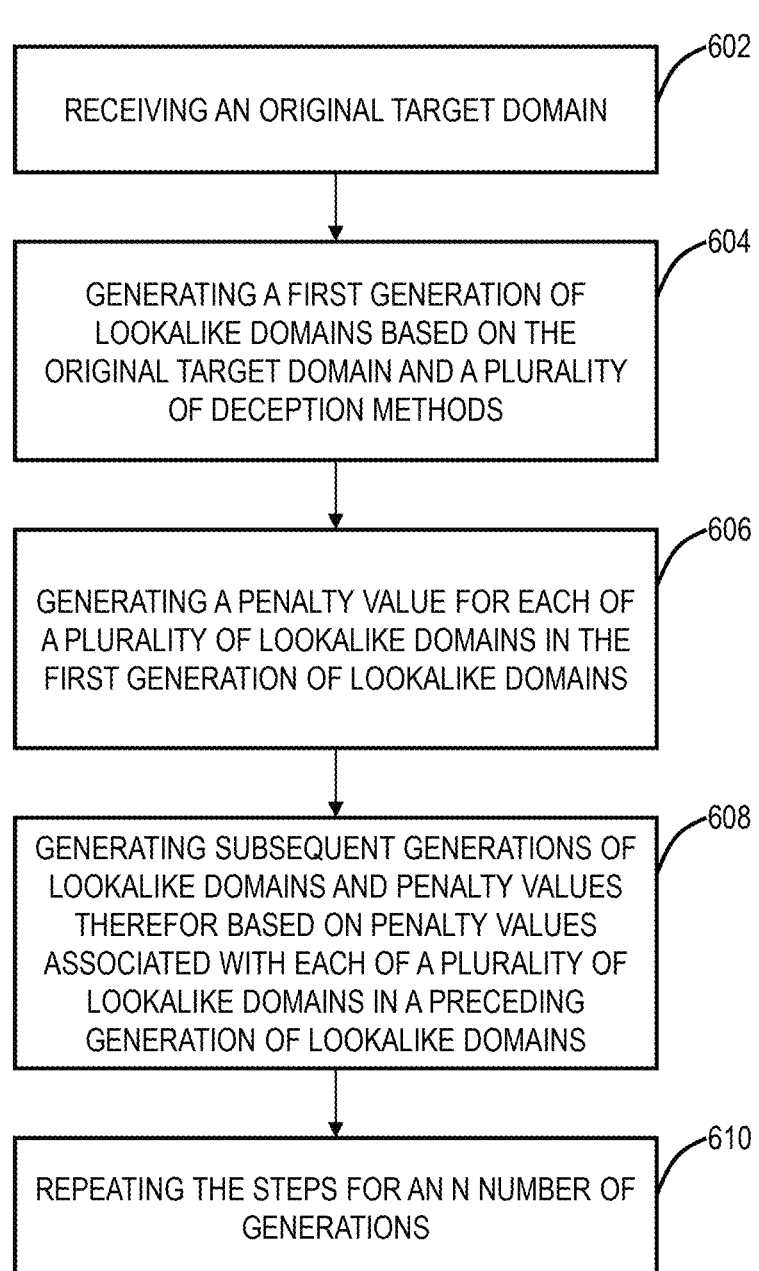
FIG. 6 is a flow diagram of a process for generating and utilizing lookalike domains based on penalty values.

FIG. 6 is a flow diagram of a process 600 for generating and utilizing lookalike domains based on penalty values. The process 600 includes receiving an original target domain (step 602); generating a first generation of lookalike domains based on the original target domain and a plurality of deception methods (step 604); generating a penalty value for each of a plurality of lookalike domains in the first generation of lookalike domains (step 606); generating subsequent generations of lookalike domains and penalty values therefor based on penalty values associated with each of a plurality of lookalike domains in a preceding generation of lookalike domains (step 608); and repeating the steps for an N number of generations (step 610).

The process 600 can further include utilizing the lookalike domains for performing one or more functions. The generating can include utilizing a genetic algorithm to generate the plurality of lookalike domains. Each of the lookalike domains in the first generation of lookalike domains can include a deception method therein. Generating the penalty value for each of the plurality of lookalike domains in the first generation can further include generating a deception penalty for each deception in a lookalike domain; generating a positional coefficient for each deception in the lookalike domain; determining a positional penalty for each character in the lookalike domain based on the deception penalty and positional coefficient; and determining the penalty value of the lookalike domain based on one or more positional penalties associated therewith and a collective penalty. The penalty value for each of the plurality of lookalike domains in subsequent generations can be based on the one or more positional penalties of its parents and a collective penalty. The collective penalty of an offspring lookalike domain can be independent of the collective penalties of its parents. Generating subsequent generations of lookalike domains can further include selecting a set of parents from a preceding generation of lookalike domains based on their penalty values; and generating the subsequent generation of lookalike domains based thereon. The selecting can include selecting parents from the preceding generation of lookalike domains based on their respective penalty value being below a threshold. The selecting and generating can be repeated until no penalty value of a lookalike domain in a subsequent generation of lookalike domains is below a threshold.

7.0 CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/ or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A method comprising steps of:
receiving an original target domain;
generating a first generation of lookalike domains based on the original target domain and a plurality of deception methods;
for each of the plurality of lookalike domains in the first generation, generating a penalty value comprising:
generating a deception penalty for each deception in the lookalike domain;
generating a positional coefficient for each deception in the lookalike domain;
determining a positional penalty for each character in the lookalike domain based on the deception penalty and positional coefficient; and
determining the penalty value of the lookalike domain based on the one or more positional penalties and a collective penalty applied to the lookalike domain as a whole;
generating subsequent generations of lookalike domains and penalty values therefor based on penalty values associated with each of a plurality of lookalike domains in a preceding generation of lookalike domains; and
repeating the steps for an N number of generations,
wherein the penalty value for each of the plurality of lookalike domains in subsequent generations is based on inherited positional penalties from its parents and a newly determined collective penalty independent of collective penalties of the parents.

2. The method of claim 1, wherein the collective penalty is based on at least one of: presence of non-Latin characters, excessive length, or more than one hyphen in the lookalike domain.

3. The method of claim 1, wherein the generating includes utilizing a genetic algorithm to generate the plurality of lookalike domains.

4. The method of claim 1, wherein each of the lookalike domains in the first generation of lookalike domains include a deception method therein.

5. The method of claim 1, wherein the collective penalty of an offspring lookalike domain is independent of the collective penalties of its parents.

6. The method of claim 1, wherein generating subsequent generations of lookalike domains further comprises:
selecting a set of parents from a preceding generation of lookalike domains based on their penalty values; and
generating the subsequent generation of lookalike domains based thereon.

7. The method of claim 6, wherein the selecting of parents is based on penalty values determined from both positional penalties and collective penalties.

8. The method of claim 6, wherein the selecting and generating are repeated until no penalty value of a lookalike domain in a subsequent generation of lookalike domains is below a threshold.

9. A non-transitory computer-readable medium comprising instructions that, when executed, cause one or more processors to perform steps of:
receiving an original target domain;
generating a first generation of lookalike domains based on the original target domain and a plurality of deception methods;
for each of the plurality of lookalike domains in the first generation, generating a penalty value comprising:
generating a deception penalty for each deception in the lookalike domain;
generating a positional coefficient for each deception in the lookalike domain;
determining a positional penalty for each character in the lookalike domain based on the deception penalty and positional coefficient; and
determining the penalty value of the lookalike domain based on the one or more positional penalties and a collective penalty applied to the lookalike domain as a whole;
generating subsequent generations of lookalike domains and penalty values therefor based on penalty values associated with each of a plurality of lookalike domains in a preceding generation of lookalike domains; and
repeating the steps for an N number of generations,
wherein the penalty value for each of the plurality of lookalike domains in subsequent generations is based on inherited positional penalties from its parents and a newly determined collective penalty independent of collective penalties of the parent.

10. The non-transitory computer-readable medium of claim 9, wherein the collective penalty is based on at least one of: presence of non-Latin characters, excessive length, or more than one hyphen in the lookalike domain.

11. The non-transitory computer-readable medium of claim 9, wherein the generating includes utilizing a genetic algorithm to generate the plurality of lookalike domains.

12. The non-transitory computer-readable medium of claim 9, wherein each of the lookalike domains in the first generation of lookalike domains include a deception method therein.

13. The non-transitory computer-readable medium of claim 9, wherein the collective penalty of an offspring lookalike domain is independent of the collective penalties of its parents.

14. The non-transitory computer-readable medium of claim 9, wherein generating subsequent generations of lookalike domains further comprises:
selecting a set of parents from a preceding generation of lookalike domains based on their penalty values; and generating the subsequent generation of lookalike domains based thereon.

15. The non-transitory computer-readable medium of claim 14, wherein the selecting of parents is based on penalty values determined from both positional penalties and collective penalties.

16. The non-transitory computer-readable medium of claim 14, wherein the selecting and generating are repeated until no penalty value of a lookalike domain in a subsequent generation of lookalike domains is below a threshold.

\* \* \* \* \*